United States Patent
Zheng et al.

(10) Patent No.: US 11,842,668 B2
(45) Date of Patent: Dec. 12, 2023

(54) DISPLAY PANEL, CONTROL METHOD THEREOF, AND ELECTRONIC DEVICE

(71) Applicant: WUHAN CHINA STAR OPTOELECTRONICS SEMICONDUCTOR DISPLAY TECHNOLOGY CO., LTD., Wuhan (CN)

(72) Inventors: Wu Zheng, Wuhan (CN); Guang Li, Wuhan (CN)

(73) Assignee: WUHAN CHINA STAR OPTOELECTRONICS SEMICONDUCTOR DISPLAY TECHNOLOGY CO., LTD., Wuhan (CN)

( * ) Notice: Subject to any disclaimer, the term of this patent is extended or adjusted under 35 U.S.C. 154(b) by 445 days.

(21) Appl. No.: 17/054,447

(22) PCT Filed: Aug. 13, 2020

(86) PCT No.: PCT/CN2020/108933
§ 371 (c)(1),
(2) Date: Nov. 10, 2020

(87) PCT Pub. No.: WO2021/227277
PCT Pub. Date: Nov. 18, 2021

(65) Prior Publication Data
US 2023/0196967 A1 Jun. 22, 2023

(30) Foreign Application Priority Data
May 13, 2020 (CN) .......................... 202010402189.2

(51) Int. Cl.
G09G 3/20 (2006.01)
G06F 1/16 (2006.01)

(52) U.S. Cl.
CPC ......... G09G 3/2092 (2013.01); G06F 1/1652 (2013.01); *G09G 2310/0267* (2013.01); *G09G 2330/022* (2013.01)

(58) Field of Classification Search
None
See application file for complete search history.

(56) References Cited

U.S. PATENT DOCUMENTS

2007/0182666 A1  8/2007 Hochman et al.
2015/0316976 A1* 11/2015 Toyotaka .............. G06F 1/3287
                                              361/679.27
2016/0111045 A1  4/2016 Yamashita et al.

FOREIGN PATENT DOCUMENTS

CN   104834497 A   8/2015
CN   105702193 A   6/2016
(Continued)

*Primary Examiner* — Ifedayo B Iluyomade
(74) *Attorney, Agent, or Firm* — PV IP PC; Wei Te Chung; Zhigang Ma

(57) ABSTRACT

The present invention provides a display panel, a control method thereof, and an electronic device. The display panel include a control module corresponding to a display region. The control module is connected to a gate driving unit in the corresponding display region and pixel driving module corresponding to the gate driving unit. The control modules is configured to control the gate driving unit in the corresponding display region to connect or disconnect with the corresponding pixel driving module according to a control signal.

16 Claims, 3 Drawing Sheets

(56) References Cited

FOREIGN PATENT DOCUMENTS

| | | | |
|---|---|---|---|
| CN | 107707729 A | 2/2018 | |
| CN | 107765835 A | 3/2018 | |
| CN | 107895561 A | 4/2018 | |
| CN | 107945666 A | 4/2018 | |
| CN | 109389953 A | 2/2019 | |
| CN | 109637417 A | 4/2019 | |
| CN | 109712532 A | 5/2019 | |
| CN | 110178174 A | 8/2019 | |
| CN | 110275599 A | 9/2019 | |
| CN | 110286865 A | 9/2019 | |
| CN | 110502090 A | 11/2019 | |
| CN | 112044069 * | 9/2020 | ........... A63F 13/525 |
| JP | 2004220113 A | 8/2004 | |

\* cited by examiner

DISPLAY PANEL, CONTROL METHOD THEREOF, AND ELECTRONIC DEVICE

FIELD OF INVENTION

The present invention is related to the field of display technology, and specifically, to a display panel, a control method thereof, and an electronic device.

BACKGROUND OF INVENTION

A display panel in the prior art includes a plurality of display regions. A folding axis is provided between two adjacent display regions, so that the display regions can be bent outward or inward. When the display regions are bent outward, display surfaces are positioned on a viewing side (which means the display surfaces are exposed). When the display regions are bent inward, non-display surfaces are positioned on the viewing side, and the display surfaces are not exposed at this time, so that users cannot watch displayed images.

However, even the display surfaces of the display regions are not exposed, the display regions still display images, and the users cannot watch the displayed images of the display regions, which increases power consumption.

SUMMARY OF INVENTION

A purpose of the present invention is to provide a display panel, a control method thereof, and an electronic device, which can reduce power consumption.

In order to solve the above problem, the present invention provides a display panel, including:
- at least two display regions, wherein a folding axis is provided between two adjacent display regions, an extension direction of the folding axis is parallel to a direction of a scan line of the display panel, and each of the display regions includes a display surface and a plurality of rows of pixels; and
- a driving circuit, including:
- a plurality of pixel driving modules, wherein each of the pixel driving modules includes a plurality of pixel driving units, and each of the pixels corresponds to each of the pixel driving units; and
- at least one gate driving module including a plurality of gate driving units cascaded with each other, wherein each of the gate driving units corresponds to each of the pixel driving modules, and each of the gate driving units is configured to provide a scan signal to each of the pixel driving units in the corresponding one of the pixel driving modules; and
- a plurality of control modules, wherein each of the control modules corresponds to each of the display regions, each of the control modules is connected to each of the gate driving units in the corresponding one of the display regions and each of the pixel driving modules corresponding to each of the gate driving units, each of the control modules is configured to control each of the gate driving units in the corresponding one of the display regions to connect or disconnect with the corresponding one of the pixel driving modules according to a control signal, the control signal is generated according to a setting parameter of the corresponding one of the display regions, and the setting parameter is configured to characterize whether the display surface of each of the display regions is exposed.

The present invention further provides an electronic device, including the above display panel.

The present invention further provides a control method of a display panel.

The display panel includes: at least two display regions, wherein a folding axis is provided between two adjacent display regions, an extension direction of the folding axis is parallel to a direction of a scan line of the display panel, and each of the display regions includes a display surface and a plurality of rows of pixels; and
- a driving circuit, including:
- a plurality of pixel driving modules, wherein each of the pixel driving modules includes a plurality of pixel driving units, and each of the pixels corresponds to each of the pixel driving units; and
- at least one gate driving module including a plurality of gate driving units cascaded with each other, wherein each of the gate driving units corresponds to each of the pixel driving modules, and each of the gate driving units is configured to provide a scan signal to each of the pixel driving units in the corresponding one of the pixel driving modules;

wherein the control method includes:
- when the display surface of each of the display regions is detected to be exposed, each of the gate driving units in each of the display regions is controlled to connect with the corresponding one of the pixel driving modules; and
- when the display surface of each of the display regions is detected to be not exposed, each of the gate driving units in each of the display regions is controlled to disconnect with the corresponding one of the pixel driving modules.

The present invention provides the display panel, the control method thereof, and the electronic device. The display panel includes the plurality of control modules. Each of the control modules corresponds to each of the display regions. Each of the control modules is connected to each of the gate driving units in the corresponding one of the display regions and each of the pixel driving modules corresponding to each of the gate driving units. Each of the control modules is configured to control each of the gate driving units in the corresponding one of the display regions to connect or disconnect with the corresponding one of the pixel driving modules according to a control signal. The control signal is generated according to a setting parameter of the corresponding one of the display regions. The setting parameter is configured to characterize whether the display surface of each of the display regions is exposed. Because of a configuration of the control modules, when the display surface of each of the display regions is not exposed, each of the display regions stops working, which reduces power consumption of the display panel.

DETAILED DESCRIPTION OF PREFERRED EMBODIMENTS

Figure 1:
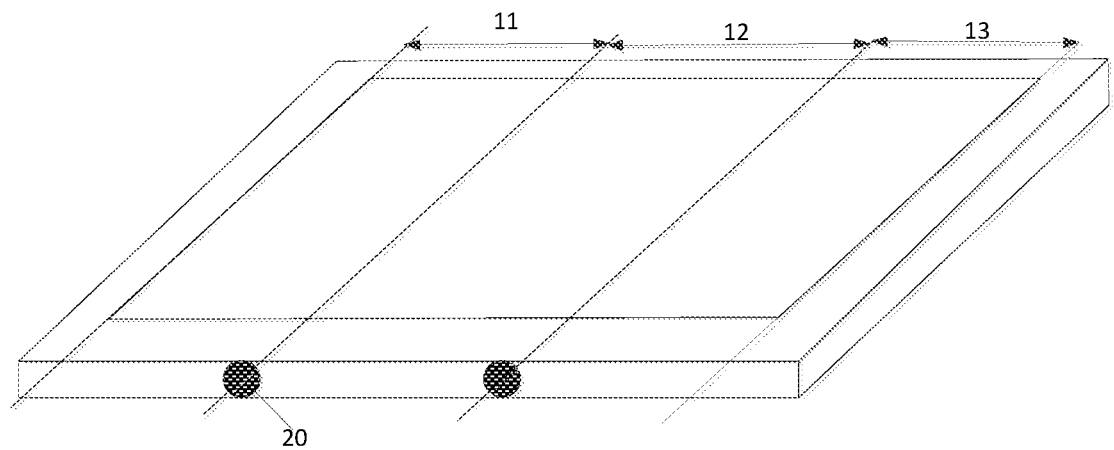
FIG. 1 is a top-view of a display panel in a flat state according to an embodiment of the present invention.

Examples are described below with reference to the appended drawings, and the drawings illustrate particular embodiments in which the present invention may be practiced. Directional terms mentioned in the present invention, such as upper, lower, front, rear, left, right, in, out, side, etc., only refer to directions in the accompanying drawings. Thus, the adoption of directional terms is used to describe and understand the present invention, but not to limit the present invention. In the drawings, units of similar structures are using the same numeral to represent.

In the specification, the claims, and the accompanying drawings, the terms "first", "second", and so on are intended to distinguish between similar objects, rather than indicate a specific order or a time order. Moreover, the terms "include", "have" and any variant thereof mean to cover the non-exclusive inclusion.

Please refer to FIGS. 1 to 4. FIG. 1 is a top-view of a display panel in a flat state according to an embodiment of the present invention.

Figure 2:
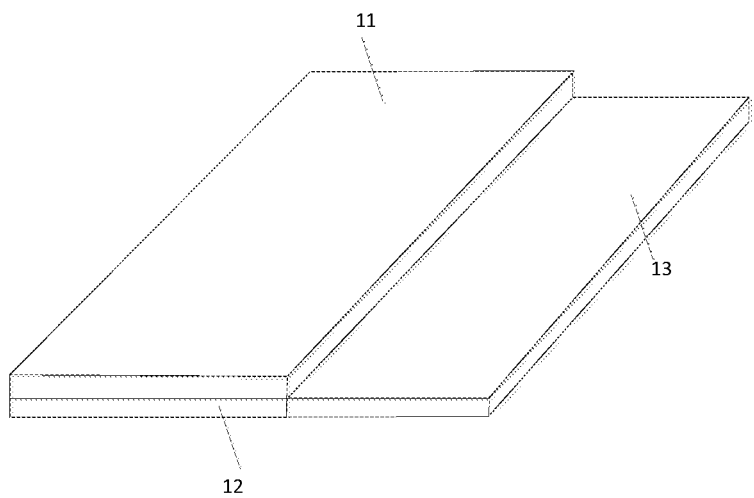
FIG. 2 is a top-view of the display panel in FIG. 1 in a folded state.

As shown in FIGS. 1 and 2, the display panel in this embodiment includes three display regions 11 through 13. A folding axis 20 is provided between two adjacent display regions. An extension direction of the folding axis 20 is parallel to a direction of a scan line of the display panel. Each of the display regions includes a plurality of rows of pixels (not shown). Understandably, the display panel can include two display regions or three display regions, in other words, numbers of the display regions and folding axis are not limited thereto. The display panel can be a flexible display panel.

Figure 3:
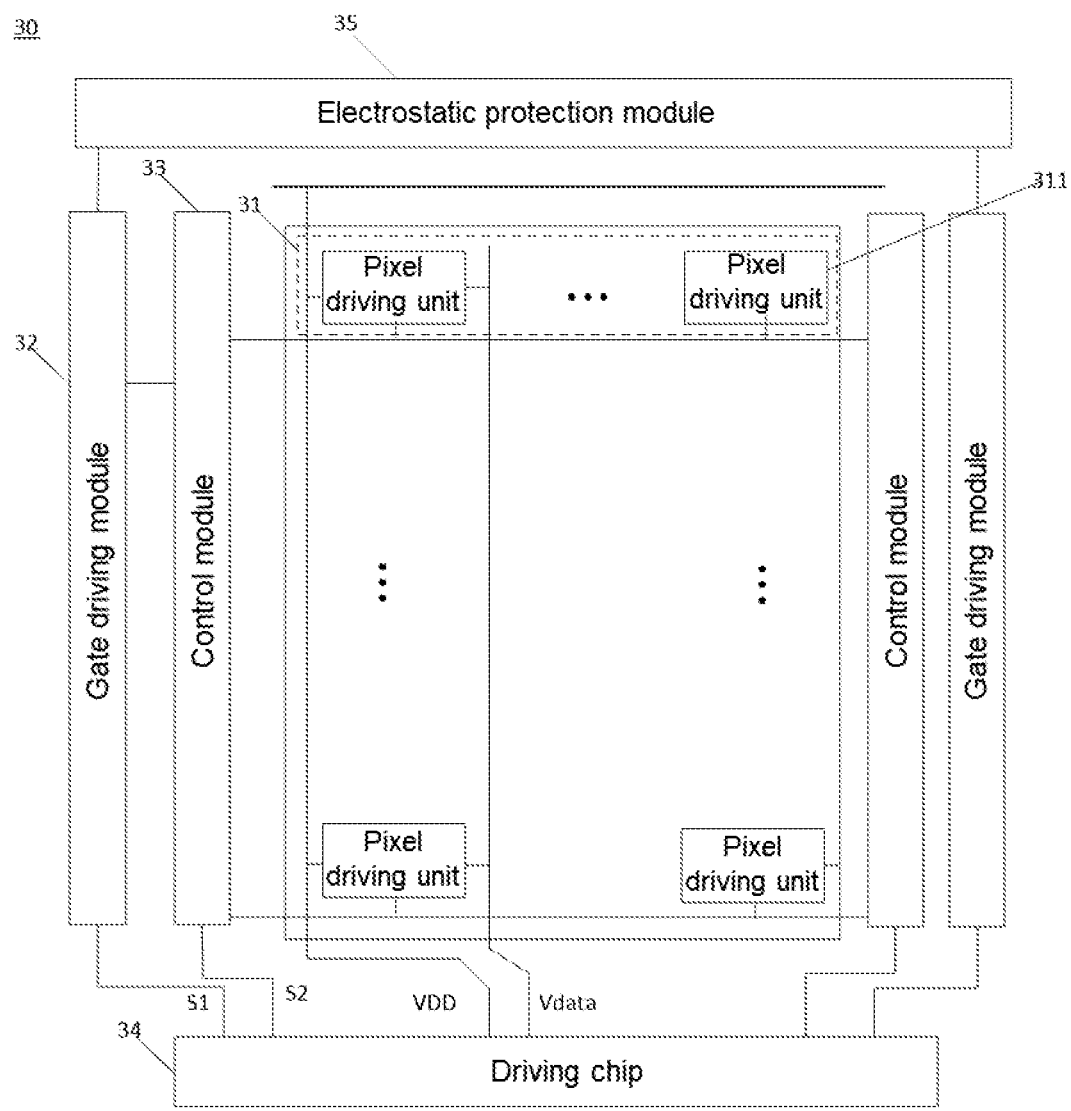
FIG. 3 is a structural schematic diagram of a driving circuit in a display region according to an embodiment of the present invention.
Figure 4:
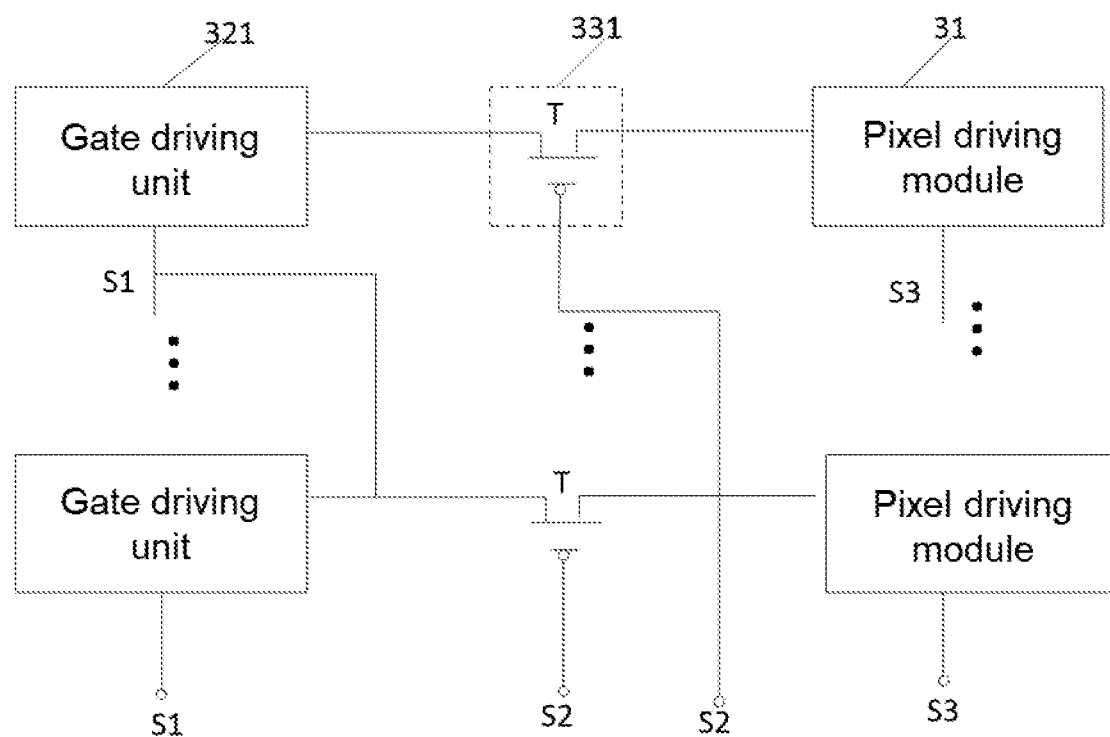
FIG. 4 is a structural schematic diagram of a control unit according to an embodiment of the present invention.

As shown in FIGS. 3 and 4, the display panel can further include a driving circuit 30. The driving circuit 30 includes a plurality of pixel driving modules 31, a gate driving module 32, and a plurality of control modules 33. The driving circuit 30 can further include a driving chip 34.

Each of the pixel driving modules 31 includes a plurality of pixel driving units 3111. Each of the pixels corresponds to each of the pixel driving units 311. Each row of the pixels corresponds to each of the pixel driving modules 31.

Referring to FIG. 4, the gate driving module 32 includes a plurality of gate driving units 321 cascaded with each other. Each of the gate driving units 321 corresponds to each of the pixel driving modules 31. Each of the gate driving units 321 is configured to provide a scan signal to each of the pixel driving units 311 in the corresponding one of the pixel driving modules 31. Therefore, the gate driving units 321 of each row of pixels provide the scan signal to the pixel driving units of a corresponding row.

Each of the control modules 33 corresponds to each of the display regions. Each of the control modules 33 is connected to each of the gate driving units 321 in the corresponding one of the display regions and each of the pixel driving modules 31 corresponding to each of the gate driving units 321. Each of the control modules 33 is configured to control each of the gate driving units 321 in the corresponding one of the display regions to connect or disconnect with the corresponding one of the pixel driving modules 31 according to a control signal S2. The control signal S2 is generated according to a setting parameter of the corresponding one of the display regions. The setting parameter is configured to characterize whether the display surface of each of the display regions is exposed. The setting parameter includes an intensity of ambient light, and can further include parameters such as bending stress and stress directions. In an embodiment, when the display regions are in an inward-folded state, the display surface of each of the display regions is not exposed; when the display regions are in an outward-folded state, the display surface of each of the display regions is exposed; and when the display regions are in a flat state, the display surface of each of the display regions is not exposed or exposed.

In an embodiment, referring to FIGS. 3 and 4, in order to increase control accuracy, each of the control modules 33 includes a plurality of control units 331. Each of the control units 331 corresponds to each of the gate driving units 321 in each of the display regions. Each of the control modules 331 is connected to the corresponding one of the gate driving units 321 and each of the pixel driving modules 31 corresponding to each of the gate driving units 321.

In another embodiment, the plurality of gate driving units 321 in each of the display regions correspond to each of the control units 331. In FIG. 3, a single display region is taken as an example, and drive circuits of other display regions are similar to this.

In an embodiment, in order to simplify a circuit structure and reduce production cost, the control signal S2 can be provided by the driving chip 34.

In an embodiment, as shown in FIG. 4, each of the control units 331 includes a transistor T. A control end of the transistor T is configured to receive the control signal S2. An input end of the transistor T is connected to the corresponding one of the gate driving units 321. An output end of the transistor T is connected to each of the pixel driving modules 31 corresponding to each of the gate driving units 321. When the control signal S2 is at a first logic level, the transistor T is turned on. When the control signal S2 is at a second logic level, the transistor T is turned off. The first logic level is different from the second logic level. The transistor T being a P-type transistor is taken as an example, when the control signal S2 is at a low logic level, the transistor T is turned on; and when the control signal S2 is at a high logic level, the transistor T is turned off. The longest duration of the control signal S2 at the first logic level is the time required for one frame (i.e., the time to traverse all scan lines of each of the display regions is about 16.6 ms at 60 Hz). Of course, a time duration of the control signal S2 at the first logic level is configured according to requirements.

When the setting parameter of each of the display regions satisfies a first preset condition, the control signal S2 is at the first logic level. When the setting parameter of each of the display regions satisfies a second preset condition, the control signal S2 is at the second logic level. The first preset condition and the second preset condition are configured according to empirical values.

In order to increase the control accuracy of each of the display regions, the setting parameter is preferably the intensity of the ambient light. A sensor for measuring the intensity of the ambient light can be preset in each of the display regions, and a specific detection method of the intensity of the ambient light is not limited herein. When the intensity of the ambient light of each of the display regions is greater than or equal to a preset value, the control signal S2 is at the first logic level. When the intensity of the ambient light of each of the display regions is less than the preset value, the control signal S2 is at the second logic level. The preset value can be configured according to empirical values, and a specific value is not limited herein.

When the display surface of each of the display regions is exposed, the intensity of the ambient light of each of the display regions is relatively high, so each of the display regions needs work. When the display surface of each of the display regions is not exposed (i.e., each of the non-display regions is exposed), the intensity of the ambient light of each of the display regions is relatively low, so each of the display regions does not need to work at this time.

Referring to FIG. 3, the driving chip 34 is connected to each of the gate driving units 321. The driving chip 34 is further configured to provide a first access signal S1 to each of the gate driving units 321. The first access signal S1 includes a clock signal and a power signal. In addition, the driving chip 34 can be connected to each of the pixel driving units 311 and provide a second access signal S3 to each of the pixel driving units 311. The second access signal S3 includes a data signal Vdata and a power signal VDD. Of course, in an embodiment, the driving chip 34 is further connected to a common line (not shown).

In an embodiment, referring to FIG. 3, in order to avoid damage to the gate driving module, the driving circuit 30 can further includes an electrostatic protection module (ESD) 35. The electrostatic protection module 35 is connected to each of the gate driving module 32.

Understandably, a number of the gate driving modules 32 can be one or two. When the number of the gate driving modules 32 is one, each of the display regions is provided with one control module. When the number of the gate driving modules 32 is two, which means that one gate driving module 32 is provided with on each of two opposite sides of each of the display regions, each of the display regions is provided with two control modules, and each gate driving module 32 corresponds to each of the control modules 33.

The present invention further provides a control method of the display panel, including the following steps:

S101, when the display surface of each of the display regions is detected to be exposed, each of the gate driving units in each of the display regions is controlled to connect with each of the pixel driving modules of a corresponding pixel row; and S102, when the display surface of each of the display regions is detected to be not exposed, each of the gate driving units in each of the display regions is controlled to disconnect with the corresponding one of the pixel driving modules.

Referring to FIGS. 2 to 4, for example, when the display surfaces of the display regions 11 and 12 are detected to be not exposed, the gate driving units 321 in the display regions 11 and 12 are controlled to disconnect with the corresponding pixel driving modules 31, which makes the display regions 11 and 12 stop working; and when the display surface of the display region 13 is detected to be exposed, the display region 13 is in the flat state, the gate driving unit 321 in the display region 13 is controlled to connect with the corresponding pixel driving modules 31, which makes the display region 13 start to work, so as to reduce the power consumption.

Of course, in another embodiment, the display regions 13 can be in the outward-folded state, which means that the display surface of the display region 13 is facing down, and the display region 13 is controlled to work, so as to reduce the power consumption.

In an embodiment, the setting parameter of each of the display regions is configured to determine whether the display surface of each of the display regions is exposed. Of course, understandably, a specific detection method is not limited herein.

When the setting parameter of each of the display regions satisfies the first preset condition, the display surface of each of the display regions is determined to be exposed.

When the setting parameter of each of the display regions satisfies the second preset condition, the display surface of each of the display regions is determined to be not exposed.

For example, when the setting parameter of each of the display regions is detected to be satisfy the first preset condition, the display surface of each of the display regions is determined to be exposed, which makes each of the display regions is in a working state, and the display regions can display images at this time; and when the setting parameter of each of the display regions is detected to be satisfy the second preset condition, the display surface of each of the display regions is determined to be not exposed, which makes each of the display regions is in a non-working state, and the display regions cannot display images at this time.

In order to increase the control accuracy of each of the display regions, the setting parameter is preferably the intensity of the ambient light. A specific detection method of the intensity of the ambient light is not limited herein. The above method specifically includes:

when the intensity of the ambient light of each of the display regions is greater than or equal to a preset value, the display surface of each of the display regions is determined to be exposed; and when the intensity of the ambient light of each of the display regions is less than the preset value, the display surface of each of the display regions is determined to be not exposed.

When the display surface of each of the display regions is exposed, the intensity of the ambient light of each of the display regions is relatively high, so each of the display regions needs work, and each of the gate driving units in each of the display regions is connected to the corresponding one of the pixel driving modules. When the display surface of each of the display regions is not exposed, the intensity of the ambient light of each of the display regions is relatively low, so each of the display regions does not need to work at this time, and each of the gate driving units in each of the display regions is disconnected with the corresponding one of the pixel driving modules. The preset value can be configured according to empirical values, and a specific value is not limited herein.

Referring to FIG. 2, when the intensity of the ambient light of the display regions 11 and 12 is detected to be relatively low, the display regions 11 and 12 are determined to be facing inward, which controls the display regions 11 and 12 stop working. When the intensity of the ambient light of the display region 13 is detected to be relatively high, the display region 13 is determined to be facing outward, which controls the display region 13 start to work, so as to reduce the power consumption.

The present invention further provides an electronic device including any one of the above display panels. The electronic device can be an electronic product such as a mobile phone and a tablet computer.

The present invention provides the display panel, the control method thereof, and the electronic device. The display panel includes the plurality of control modules. Each of the control modules corresponds to each of the display regions. Each of the control modules is connected to each of the gate driving units in the corresponding one of the display regions and each of the pixel driving modules corresponding to each of the gate driving units. Each of the control modules is configured to control each of the gate driving units in the corresponding one of the display regions to connect or disconnect with the corresponding one of the pixel driving modules according to a control signal. The control signal is generated according to a setting parameter of the corresponding one of the display regions. The setting parameter is configured to characterize whether the display surface of each of the display regions is exposed. Because of a configuration of the control modules, when the display surface of each of the display regions is not exposed, each of the display regions stops working, which reduces power consumption of the display panel.

Although the present invention has been disclosed above with the preferred embodiments, it is not intended to limit the present invention. Persons having ordinary skill in this technical field can still make various alterations and modifications without departing from the scope and spirit of this invention. Therefore, the scope of the present invention should be defined and protected by the following claims and their equivalents.

What is claimed is:

1. A display panel, comprising:
    at least two display regions, wherein a folding axis is provided between two adjacent display regions, an extension direction of the folding axis is parallel to a direction of a scan line of the display panel, and each of the display regions comprises a display surface and a plurality of rows of pixels; and
    a driving circuit, comprising:
    a plurality of pixel driving modules, wherein each of the pixel driving modules comprises a plurality of pixel driving units, and each of the pixels corresponds to each of the pixel driving units;
    at least one gate driving module comprising a plurality of gate driving units cascaded with each other, wherein each of the gate driving units corresponds to each of the pixel driving modules, and each of the gate driving units is configured to provide a scan signal to each of the pixel driving units in the corresponding one of the pixel driving modules; and
    a plurality of control modules, wherein each of the control modules corresponds to each of the display regions, each of the control modules is connected to each of the gate driving units in the corresponding one of the display regions and each of the pixel driving modules corresponding to each of the gate driving units, each of the control modules is configured to control each of the gate driving units in the corresponding one of the display regions to connect or disconnect with the corresponding one of the pixel driving modules according to a control signal, the control signal is generated according to a setting parameter of the corresponding one of the display regions, and the setting parameter is configured to characterize whether the display surface of each of the display regions is exposed.

2. The display panel according to claim 1, wherein the driving circuit further comprises:
    a driving chip connected to each of the gate driving units, wherein the driving chip is configured to provide a first access signal to each of the gate driving units and further provide the control signal.

3. An electronic device, comprising a display panel, wherein the display panel comprises:
    at least two display regions, wherein a folding axis is provided between two adjacent display regions, an extension direction of the folding axis is parallel to a direction of a scan line of the display panel, and each of the display regions comprises a display surface and a plurality of rows of pixels; and
    a driving circuit, comprising:
    a plurality of pixel driving modules, wherein each of the pixel driving modules comprises a plurality of pixel driving units, and each of the pixels corresponds to each of the pixel driving units;
    at least one gate driving module comprising a plurality of gate driving units cascaded with each other, wherein each of the gate driving units corresponds to each of the pixel driving modules, and each of the gate driving units is configured to provide a scan signal to each of the pixel driving units in the corresponding one of the pixel driving modules; and
    a plurality of control modules, wherein each of the control modules corresponds to each of the display regions, each of the control modules is connected to each of the gate driving units in the corresponding one of the display regions and each of the pixel driving modules corresponding to each of the gate driving units, each of the control modules is configured to control each of the gate driving units in the corresponding one of the display regions to connect or disconnect with the corresponding one of the pixel driving modules according to a control signal, the control signal is generated according to a setting parameter of the corresponding one of the display regions, and the setting parameter is configured to characterize whether the display surface of each of the display regions is exposed.

4. The electronic device according to claim 3, wherein the driving circuit further comprises:
    a driving chip connected to each of the gate driving units, wherein the driving chip is configured to provide a first access signal to each of the gate driving units and further provide the control signal.

5. The display panel according to claim 1, wherein each of the control modules comprises a plurality of control units, each of the control units corresponds to each of the gate driving units in each of the display regions.

6. The display panel according to claim 5, wherein each of the control units comprises a transistor; and
    a control end of the transistor is configured to receive the control signal, an input end of the transistor is connected to the corresponding one of the gate driving units, and an output end of the transistor is connected to each of the pixel driving modules corresponding to each of the gate driving units.

7. The display panel according to claim 6, wherein when the control signal is at a first logic level, the transistor is turned on;
    when the control signal is at a second logic level, the transistor is turned off; and
    the first logic level is different from the second logic level.

8. The display panel according to claim 7, wherein when the setting parameter of each of the display regions satisfies a first preset condition, the control signal is at the first logic level; and
    when the setting parameter of each of the display regions satisfies a second preset condition, the control signal is at the second logic level.

9. The display panel according to claim 8, wherein the setting parameter comprises an intensity of ambient light.

10. The display panel according to claim 9, wherein when the intensity of the ambient light of each of the display regions is greater than or equal to a preset value, the control signal is at the first logic level; and
    when the intensity of the ambient light of each of the display regions is less than the preset value, the control signal is at the second logic level.

11. The electronic device according to claim 3, wherein each of the control modules comprises a plurality of control units, each of the control units corresponds to each of the gate driving units in each of the display regions.

12. The electronic device according to claim 11, wherein each of the control units comprises a transistor; and
a control end of the transistor is configured to receive the control signal, an input end of the transistor is connected to the corresponding one of the gate driving units, and an output end of the transistor is connected to each of the pixel driving modules corresponding to each of the gate driving units.

13. The electronic device according to claim 12, wherein when the control signal is at a first logic level, the transistor is turned on;
when the control signal is at a second logic level, the transistor is turned off; and
the first logic level is different from the second logic level.

14. The electronic device according to claim 13, wherein when the setting parameter of each of the display regions satisfies a first preset condition, the control signal is at the first logic level; and
when the setting parameter of each of the display regions satisfies a second preset condition, the control signal is at the second logic level.

15. The electronic device according to claim 14, wherein the setting parameter comprises an intensity of ambient light.

16. The electronic device according to claim 15, wherein when the intensity of the ambient light of each of the display regions is greater than or equal to a preset value, the control signal is at the first logic level; and
when the intensity of the ambient light of each of the display regions is less than the preset value, the control signal is at the second logic level.

* * * * *